(12) United States Patent
Furuya

(10) Patent No.: US 11,679,462 B2
(45) Date of Patent: Jun. 20, 2023

(54) WORKPIECE TRANSFER SYSTEM

(71) Applicant: FANUC CORPORATION, Yamanashi (JP)

(72) Inventor: Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 291 days.

(21) Appl. No.: 17/106,576

(22) Filed: Nov. 30, 2020

(65) Prior Publication Data

US 2021/0187682 A1 Jun. 24, 2021

(30) Foreign Application Priority Data

Dec. 24, 2019 (JP) .............................. JP2019-232862

(51) Int. Cl.
*B23Q 7/04* (2006.01)
*B25J 11/00* (2006.01)
*B23K 26/03* (2006.01)
*F27D 3/00* (2006.01)
*B23K 26/082* (2014.01)

(52) U.S. Cl.
CPC .......... *B23Q 7/046* (2013.01); *B23K 26/0342* (2015.10); *B25J 11/005* (2013.01); *B23K 26/082* (2015.10); *F27D 3/0024* (2013.01)

(58) Field of Classification Search
CPC .. B23K 26/082; B23K 26/0342; B23Q 7/046; B25J 11/005; F27D 3/0024
See application file for complete search history.

(56) References Cited

U.S. PATENT DOCUMENTS

| | | | |
|---|---|---|---|
| 2010/0089882 A1 | 4/2010 | Tamura | |
| 2015/0306773 A1 | 10/2015 | Watanabe | |
| 2016/0369427 A1 * | 12/2016 | Mizuno | ..................... F27B 9/28 |
| 2019/0217503 A1 * | 7/2019 | Drost | ................ B29C 66/91216 |
| 2020/0016691 A1 * | 1/2020 | Tanaka | ................. B23K 26/082 |
| 2021/0107051 A1 * | 4/2021 | Saylor | ...................... B60B 3/10 |
| 2022/0226931 A1 * | 7/2022 | Kotar | ................. B23K 26/0869 |

FOREIGN PATENT DOCUMENTS

| | | | | |
|---|---|---|---|---|
| DE | 102016220431 A1 * | 4/2018 | ............ | B29B 13/08 |
| JP | H05-92229 A | 4/1993 | | |
| JP | 2008-191107 A | 8/2008 | | |
| JP | 2009-248160 A | 10/2009 | | |
| JP | 2015-205383 A | 11/2015 | | |
| KR | 101796198 B1 * | 9/2017 | ........... | B23K 16/044 |

* cited by examiner

*Primary Examiner* — Vincent H Tran
(74) *Attorney, Agent, or Firm* — Maier & Maier, PLLC

(57) ABSTRACT

A workpiece transfer system including a robot that transfers a workpiece taken out of a furnace to a press forging device, a temperature measuring device that measures a temperature distribution of the workpiece being transferred by the robot, and a heating device that is capable of locally heating the workpiece in a low temperature region of the temperature distribution measured by the temperature measuring device.

6 Claims, 3 Drawing Sheets

WORKPIECE TRANSFER SYSTEM

CROSS-REFERENCE TO RELATED APPLICATIONS

This application claims the benefit of Japanese Patent Application No. 2019-232862, the content of which is incorporated herein by reference.

FIELD

The present disclosure relates to a workpiece transfer system.

BACKGROUND

A workpiece transfer device is known that transfers a workpiece taken out of a furnace to a mold at a time of hot forging (e.g., see Japanese Unexamined Patent Application, Publication No. Hei 5-92229).

This workpiece transfer device detects a posture of the workpiece with an infrared camera, and the workpiece is handled by a robot. Consequently, the workpiece is transferred to the mold while adjusting the posture of the workpiece. This reduces time required to transfer the workpiece and adjust the posture, to reduce temperature drop of the workpiece.

SUMMARY

An aspect of the present disclosure is a workpiece transfer system including a robot that transfers a workpiece taken out of a furnace to a press forging device, a temperature measuring device that measures a temperature distribution of the workpiece being transferred by the robot, and a heating device that is capable of locally heating the workpiece in a low temperature region of the temperature distribution measured by the temperature measuring device.

DETAILED DESCRIPTION OF EMBODIMENTS

Figure 1:
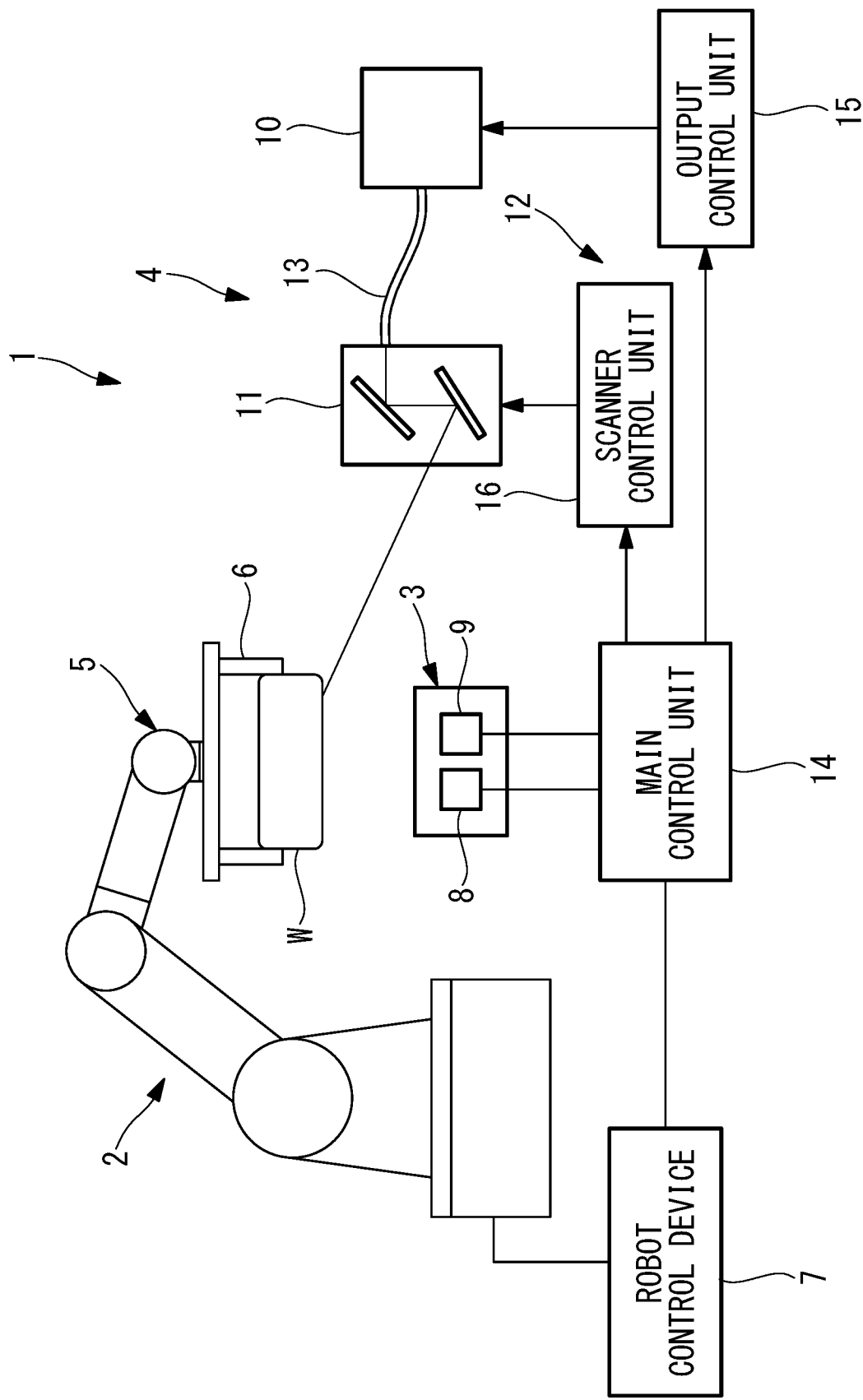
FIG. 1 is an overall configuration diagram showing a workpiece transfer system according to an embodiment of the present disclosure.

Hereinafter, description will be made as to a workpiece transfer system 1 according to an embodiment of the present disclosure with reference to the drawings. The workpiece transfer system 1 according to the present embodiment includes a robot 2 that transfers a workpiece W heated in a heating furnace (a furnace) to a press forging device (not shown), a temperature measuring device 3 that measures a temperature distribution of the workpiece W, a heating device 4 capable of locally heating the workpiece W, and a robot control device 7.

The robot 2 is, for example, a vertical 6-axis articulated type robot, and has a hand 6 provided at a tip of a wrist 5 to hold the workpiece W. In the robot 2, a motor that drives each joint includes an unshown encoder that detects a rotation angle position of each joint, and the robot control device 7 connected to the robot 2 controls the robot 2 based on positional information detected by the encoder.

Figure 2:
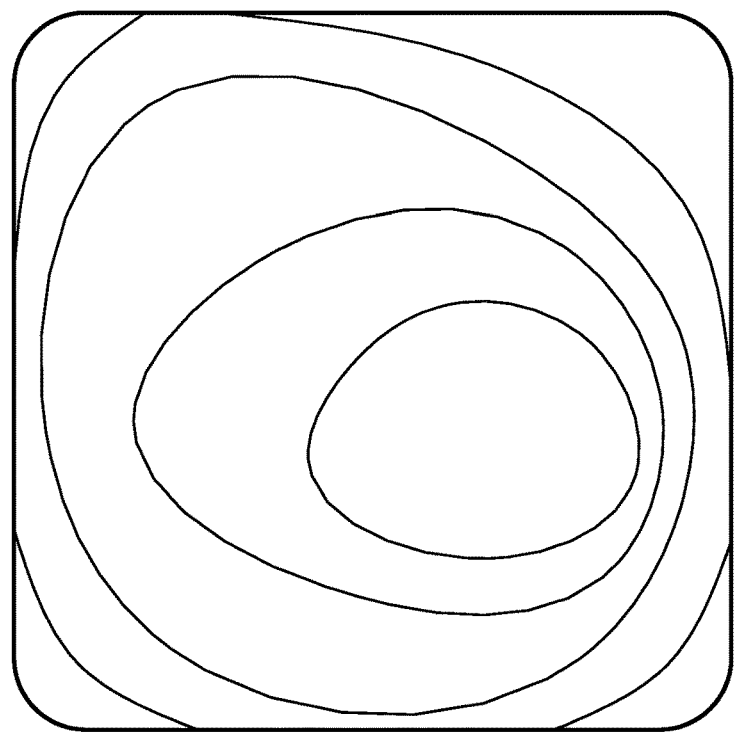
FIG. 2 is a diagram of an example of a temperature distribution in a workpiece obtained by a temperature measuring device of the workpiece transfer system of FIG. 1 and shown with contour lines.

The temperature measuring device 3 includes a camera (a position detecting device) 8 disposed at an intermediate position of a transfer path of the workpiece W by the robot 2, to photograph the workpiece W, and an infrared radiation thermometer 9 that measures a temperature of the workpiece W. Consequently, as shown in FIG. 2, a temperature distribution inside a contour of the workpiece W obtained by the camera 8 can be measured by the infrared radiation thermometer 9.

As shown in FIG. 1, the heating device 4 includes a laser oscillator 10 that generates laser light, a scanner 11 that two-dimensionally scans the laser light emitted from the laser oscillator 10, and a laser control device 12 that controls these components. In the drawing, reference number 13 denotes an optical fiber that guides the laser light emitted from the laser oscillator 10 to the scanner 11.

The laser control device 12 includes a main control unit 14, an output control unit 15, and a scanner control unit 16. The laser control device 12 is composed of a processor and a memory.

Figure 3:
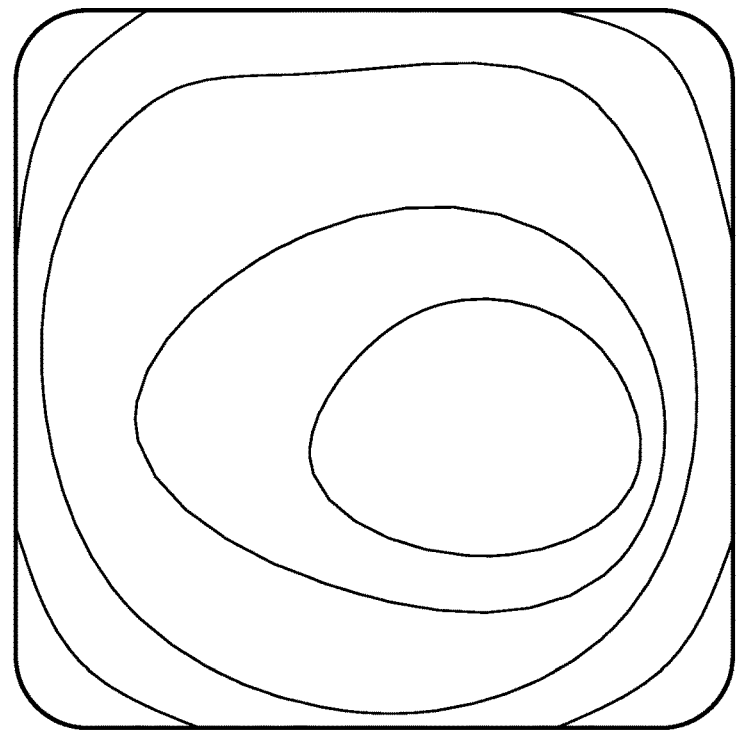
FIG. 3 is a diagram of an example of a target temperature distribution stored in a storage unit of a main control unit of the workpiece transfer system of FIG. 1 and shown with contour lines.
Figure 4:
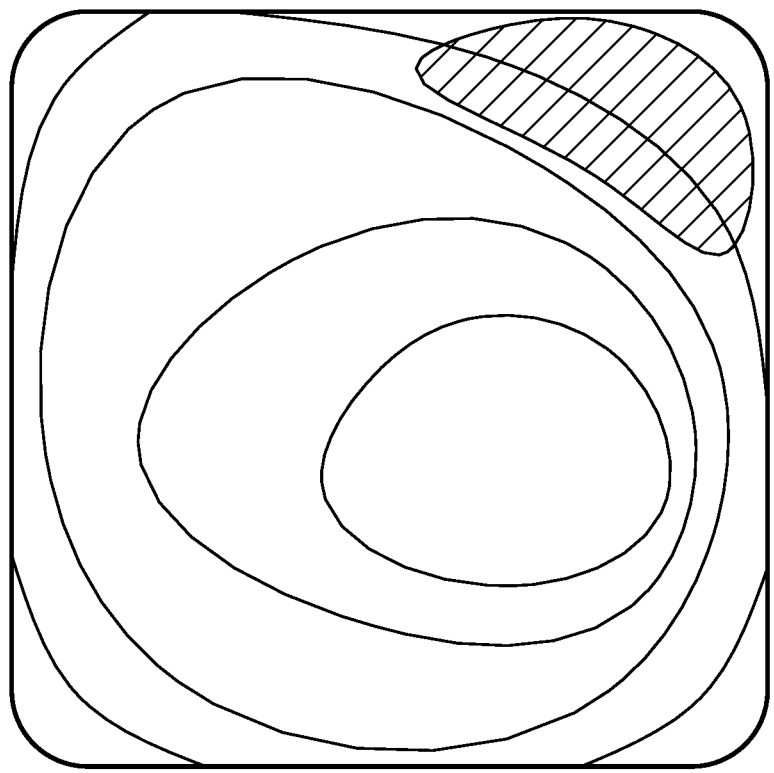
FIG. 4 is a diagram of an example of a low temperature region to be heated based on the temperature distribution of FIG. 2 and the target temperature distribution of FIG. 3 and shown with diagonal lines.

The main control unit 14 includes a storage unit (not shown) that stores a target temperature distribution of the workpiece W shown in FIG. 3. The main control unit 14 compares the temperature distribution of FIG. 2 measured by the camera 8 and the infrared radiation thermometer 9 with the target temperature distribution of FIG. 3 stored in the storage unit, and extracts, for example, information of a low temperature region at a temperature lower than that of the target temperature distribution shown with diagonal lines in FIG. 4. The information of the low temperature region includes local positional information (in a coordinate system fixed to the workpiece W) of the low temperature region in a contour of the workpiece W, for example, seen from below, and information of a temperature difference from the temperature of the target temperature distribution in the low temperature region.

Furthermore, the main control unit 14 sequentially obtains, from the robot control device 7, the positional information of the workpiece W held with the hand 6 by the robot 2. Specifically, the unit obtains angle information of each joint of the robot 2, and calculates global positional information (in a coordinate system fixed to an installation surface of the robot 2) of the workpiece W held with the hand 6. Then, the main control unit 14 sequentially calculates the global positional information of the low temperature region based on the global positional information of the workpiece W and the local positional information of the extracted low temperature region.

The main control unit 14 sends, to the scanner control unit 16, the calculated global positional information of the low temperature region, and sends, to the output control unit 15, the information of the temperature difference between the temperature of the information of the extracted low temperature region and the temperature of the target temperature distribution. The output control unit 15 calculates intensity of required laser light based on the sent information of the temperature difference, and controls the laser oscillator 10 to emit the laser light with the calculated intensity.

Furthermore, the scanner control unit 16 controls the scanner 11 based on the global positional information of the low temperature region that moves every moment so that the scanner 11 follows the moving low temperature region, and continues to irradiate the low temperature region with the laser light. When the low temperature region is small, a pin point of the low temperature region is irradiated with the laser light, and when the low temperature region is large, the laser light is scanned over the whole low temperature region.

Hereinafter, description will be made as to operations of the workpiece transfer system 1 according to the present embodiment including such a configuration. To transfer the workpiece W taken out of the heating furnace to the press forging device by use of the workpiece transfer system 1 according to the present embodiment, the workpiece W is held with the hand 6 attached to the tip of the wrist 5 of the robot 2, and the workpiece W is moved to a view field range of the camera 8 and a measurement range of the infrared radiation thermometer 9. Consequently, a contour shape of the workpiece W and the temperature distribution inside the shape are obtained. The contour shape of the workpiece W and the information of the temperature distribution that are obtained are sent to the main control unit 14 of the laser control device 12.

The main control unit 14 compares the measured temperature distribution with the target temperature distribution stored in the storage unit, to extract the positional information of the low temperature region at the temperature lower than the temperature of the target temperature distribution, in the contour of the workpiece W, and the information of the temperature difference. Then, the main control unit 14 calculates the global positional information of the low temperature region based on the global positional information of the workpiece W sequentially obtained from the robot control device 7 and the local positional information of the low temperature region obtained from the camera 8.

The sequentially calculated global positional information of the low temperature region is sent to the scanner control unit 16, and the scanner 11 is controlled to continue to irradiate the low temperature region with the laser light. Furthermore, the information of the temperature difference extracted in the main control unit 14 is sent to the output control unit 15, and the intensity of the laser light output from the laser oscillator 10 is adjusted. That is, in a case where the temperature difference is large, the intensity of the laser light is increased, and in a case where the temperature difference is small, the intensity of the laser light is decreased.

Consequently, according to the workpiece transfer system 1 of the present embodiment, on the path where the workpiece W taken out of the heating furnace and held with the hand 6 is transferred to the press forging device by the robot 2, the temperature distribution is measured, and the low temperature region is extracted. Then, the low temperature region continues to be heated by the irradiation with the laser light during the transfer by the robot 2, and the temperature difference from the target temperature distribution is decreased.

In this case, according to the workpiece transfer system 1 of the present embodiment, the scanner 11 follows and heats the workpiece W being transferred by the robot 2. Consequently, there is an advantage that the workpiece can be efficiently heated and that cycle time can be shortened, in comparison with a case where the workpiece W is stopped and heated.

Furthermore, the workpiece W can be locally and efficiently heated with the laser light. Additionally, the scanning of the laser light by the scanner 11 is advantageous in that the workpiece W can be sufficiently heated irrespective of a size of the low temperature region. As a result, if a temperature of the workpiece W partially drops due to heat dissipation from the workpiece W, the temperature distribution of the workpiece W being transferred is corrected properly and that quality of the forged workpiece W can be stabilized.

Note that in the present embodiment, the movement of the workpiece W by the robot 2 is followed (tracked), and the low temperature region of the workpiece W is irradiated with the laser light by the scanner 11. Alternatively, the workpiece W may be heated at a fixed position, without being tracked.

Furthermore, in the present embodiment, quality information of moldability of the forged workpiece W may be obtained, and the target temperature distribution of a region where the moldability is not satisfactory may be corrected. For example, a temperature of a region where the moldability is poor in the target temperature distribution may rise. The quality information of the moldability may be obtained by measuring the forged workpiece W by an operator, or may be obtained by measuring a three-dimensional shape of the forged workpiece W.

Additionally, in the present embodiment, as the heating device 4, the device that heats by the irradiation with the laser light has been illustrated. Alternatively, any type of heating device 4 may be employed. Furthermore, as the robot 2, the 6-axis articulated type robot has been illustrated, but the present invention is not limited to this embodiment, and any type of robot may be used.

The invention claimed is:

1. A workpiece transfer system comprising:
    a robot that transfers a workpiece taken out of a furnace to a press forging device;
    a camera that has a view field range including a path where the workpiece is transferred by the robot and that acquires an image of the view field range;
    a thermometer that measures a temperature distribution of the view field range;
    a controller that stores a target temperature distribution of the workpiece; and
    a heating device, wherein the controller detects, while the workpiece is transferred by the robot, a position of the workpiece based on the image acquired by the camera and compares the temperature distribution measured by the thermometer with the stored target temperature distribution so as to sequentially determine a low temperature region of the workpiece, and the heating device heats the determined low temperature region each time the low temperature region is determined by the controller.

2. The workpiece transfer system according to claim 1, wherein the controller corrects the stored target temperature distribution based on quality information of moldability of the workpiece in the press forging device and compares the temperature distribution measured by the thermometer with the corrected target temperature distribution.

3. The workpiece transfer system according to claim 1, wherein the heating device comprises a scanner and heats the determined low temperature region by scanning laser light over the determined low temperature region.

4. The workpiece transfer system according to claim 2, wherein the heating device comprises a scanner and heats the determined low temperature region by scanning laser light over the determined low temperature region.

5. The workpiece transfer system according to claim 4, wherein,
the controller calculates a difference between a temperature of the determined low temperature region and a temperature of a region corresponding to the determined low temperature region in the corrected target temperature distribution, and
the heating device adjusts intensity of the laser light according to the calculated difference.

6. The workpiece transfer system according to claim 3, wherein,
the controller calculates a difference between a temperature of the determined low temperature region and a temperature of a region corresponding to the determined low temperature region in the stored target temperature distribution, and
the heating device adjusts intensity of the laser light according to the calculated difference.

* * * * *